United States Patent [19]
Bach et al.

[11] 3,855,321
[45] Dec. 17, 1974

[54] CONVERSION OF OLEFINS TO ALLYLIC CHLORIDES

[75] Inventors: Hartwig C. Bach; Helmuth E. Hinderer, both of Pensacola, Fla.

[73] Assignee: Monsanto Company, St. Louis, Mo.

[22] Filed: Jan. 12, 1970

[21] Appl. No.: 2,356

[52] U.S. Cl.............................................. 260/654 R
[51] Int. Cl................................................ C07c 21/00
[58] Field of Search...................... 260/654 R, 654 A

[56] References Cited
UNITED STATES PATENTS

| | | | |
|---|---|---|---|
| 3,194,847 | 7/1965 | Capp et al. | 260/654 |
| 3,513,207 | 5/1970 | Hornig et al. | 260/654 |
| 3,079,444 | 2/1963 | Jacobowsky et al. | 260/654 |
| 3,479,392 | 11/1969 | Stern et al. | 260/614 |

OTHER PUBLICATIONS
"Dimethylformamide Chemical Uses," R. S. Kittila (1967), pp. 78–81.

*Primary Examiner*—Leon Zitver
*Assistant Examiner*—A. Siegel
*Attorney, Agent, or Firm*—John W. Whisler

[57] ABSTRACT

Allylic chloride is produced in a liquid phase process by mixing an olefin having an allylic hydrogen atom with a catalyst system comprising complexes of palladium chloride, a transition metal salt and a reoxidation catalyst with an N,N-dialkylamide at temperatures between about 0° and 180°C. The olefin and palladium chloride form a $\pi$-allyl palladium complex which decomposes in solution to yield the corresponding allylic chloride and palladium. The transition metal salt catalyzes the decomposition of the complex. The reoxidation catalyst oxidizes palladium to palladium chloride. By providing sufficient amounts of olefin in the system, one equivalent of palladium chloride will repeatedly form complex until all the reoxidation catalyst has been used (i.e., reduced). The reoxidation catalyst may be regenerated in situ.

8 Claims, No Drawings

CONVERSION OF OLEFINS TO ALLYLIC CHLORIDES

BACKGROUND OF THE INVENTION

Allylic chlorides, such as allyl chloride, are valuable chemical intermediates and are presently produced commercially by reacting an olefin with chlorine at high temperatures, e.g., propylene with chlorine at 450°–500°C. This process provides only mediocre selectivity of the desired allylic halide formation and is expensive due to the high temperatures required.

A laboratory method for preparing allyl chloride is described in Angew. Chem., Vol. 71 (1959), p. 284. This method consists of first forming a $\pi$-allyl palladium complex,

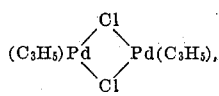

by reacting allyl alcohol with palladium chloride and then heating the solid complex to yield allyl chloride and palladium metal. A similar method for preparing methallyl chloride is also described in the same volume of Angew. Chem. at p. 465. These methods however are not economically feasible for commercial preparation of allyl chlorides since palladium chloride and allyl alcohol are expensive and there is no apparent way to conveniently regenerate palladium chloride from the palladium metal that is formed upon thermal decomposition of the complex.

Accordingly, an object of the present invention is to provide a simple, straightforward and economical process for the preparation of allylic chlorides.

Another object of the invention is to provide a process for the preparation of allylic chlorides which can be carried out under relatively mild conditions in conventional apparatus.

Other objects of the invention will become apparent from the following description.

SUMMARY OF THE INVENTION

The above and other objects are accomplished by the process of the present invention which provides for the preparation of allylic chlorides by catalytic oxidative chlorination of olefins having an allylic hydrogen atom in a homogeneous, liquid phase catalyst system comprising complexes of palladium chloride ($PdCl_2$), a transition metal salt and a reoxidation catalyst with N,N-dialkyl amides, which system preferably contains as a modifier, chloride ions (added as metal chlorides or HCl) or a nitrile. Preferably, the process is carried out using cupric chloride ($CuCl_2$) as both the transition metal salt and reoxidation catalyst.

Several reactions occur simultaneously in the liquid catalyst system. Using propylene as the olefin and cupric chloride as the transition metal chloride and the reoxidation catalyst, these reactions may be illustrated as follows:

1. propylene reacts with $PdCl_2$ to form a $\pi$-allyl palladium complex, e.g:

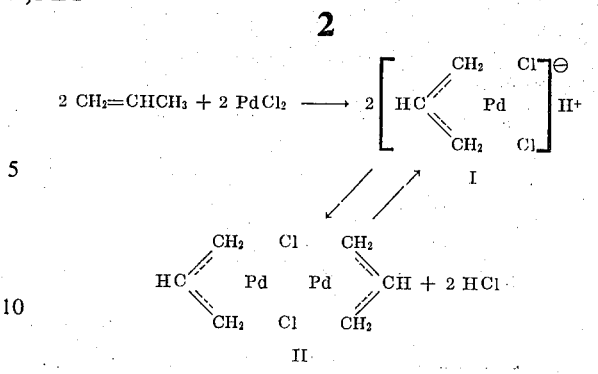

2. $CuCl_2$ promotes decomposition of the complexes I or II, e.g.:

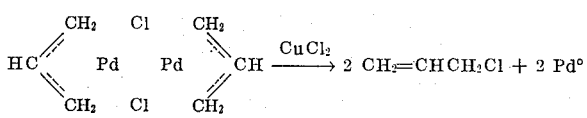

3. $CuCl_2$ oxidizes $Pd°$ to $PdCl_2$, e.g.:
   $2\ CuCl_2 + Pd° \rightarrow 2\ CuCl + PdCl_2$ 4. the dialkyl amide solvent serves to dissolve the metal salts and olefin, to promote formation of the complex, and also as a weak base to tie up HCl and shift the equilibrium of the reaction to favor formation of the bis($\pi$-allyl palladium) complex, e.g.:

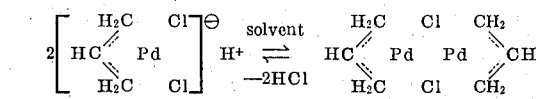

The presence of $CuCl_2$ in the reacting mixture enables one equivalent of $PdCl_2$ to repeatedly react with additional olefin to produce additional allylic chloride via the $\pi$-allyl palladium complex. This chain-like reaction will continue so long as there are present in the reacting mixture two equivalents of $CuCl_2$ for each equivalent of $Pd°$ formed. Eventually, the system becomes depleted of $CuCl_2$ since in oxidizing $Pd°$ to $PdCl_2$, $CuCl_2$ is reduced to CuCl. At this point no further complex or allylic chloride is produced.

According to a preferred embodiment of the invention, the depleted catalyst system is regenerated by oxidizing the CuCl to $CuCl_2$. This is accomplished by passing hydrogen chloride (HCl) and molecular oxygen or a gas containing molecular oxygen (e.g., air) through the depleted catalyst system:

$4CuCl + HCl + O_2 \rightarrow 4CuCl_2 + 2H_2O$.

Thus, by application of this embodiment the process consists of two cycles, a production cycle and a regeneration cycle, which may be repeated indefinitely. All water formed during each regeneration cycle should be removed from the system, otherwise a significant amount of acetone will be produced during the subsequent production cycle.

The process of the present invention has many advantages over prior art processes for preparing allylic chlorides, such as allyl chloride. For example, the invention provides a semi-continuous, straightforward process for preparing allylic chlorides from olefins which can be carried out with conventional equipment under relatively mild reaction conditions. Also, the process provides for a high production rate of allylic chloride.

PREFERRED EMBODIMENTS OF THE INVENTION

The overall reaction involved in the production of the allylic chloride may be represented by the following equation:

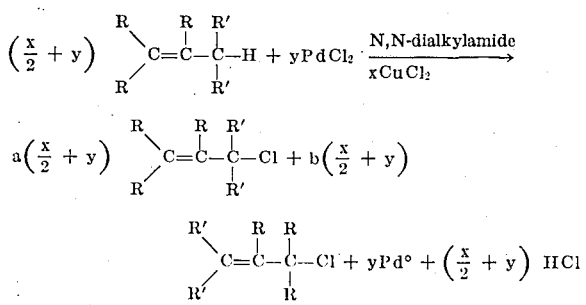

where $x$ and $y$ are numbers representing moles or equivalents, $a$ and $b$ are fractions, the sum of which is 1, and R and R' represent a monovalent radical or an atom.

In a preferred embodiment 10 equivalents of olefin is reacted with one equivalent $PdCl_2$ and 6 equivalents $CuCl_2$ to produce 10 equivalents allylic chloride. The mole ratio of compounds, however, is not critical and may be varied over a wide range; for example, a mole ratio of 100:1 to 3:1, $CuCl_2$ to $PdCl_2$, can be used. In fact, the reaction will occur with only trace amounts of the compounds or with excess amounts of any combination of the compounds. A mole ratio of about 5 to 10:1, $CuCl_2$ to $PdCl_2$ usually produces satisfactory results.

Suitable olefins for use in the invention are those having the unit

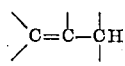

and which may be represented by the structure

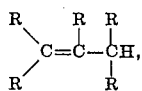

wherein R is an atom, such as hydrogen, or any organic or inorganic radical. The nature of the R atom or radical is not critical since the reaction proceeds through the formation of π-allyl palladium complex and requires only that the olefin contain an allylic hydrogen atom. Representative R radicals and atoms include branched or unbranched $C_1$ to $C_{20}$ alkyl radicals, phenyl, cycloalkyl, alkaryl, benzyl and like radicals, nitro radical, etc., halide and hydrogen atoms. Preferred olefins for use in carrying out the invention are the $C_3$ to $C_6$ alkenes, e.g., propylene, butylene and pentylene and the phenyl substituted $C_3$ to $C_6$ alkanes, e.g., 3-phenylpropylene. These olefins are preferred since the allylic chlorides prepared therefrom have recognized applications in the art.

It is essential that the process be carried out in the presence of at least one N,N-dialkyl amide, as solvent. Suitable N,N-dialkyl amides that may be employed are those represented by the following formulas:

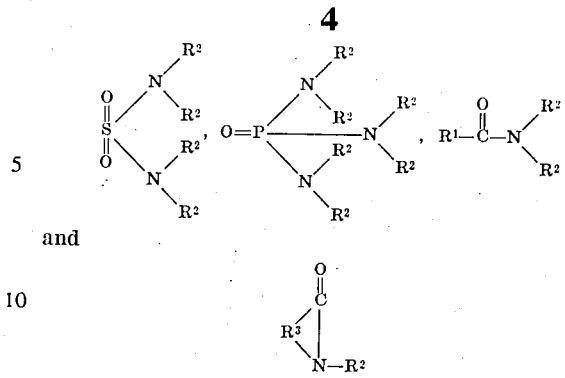

wherein $R^1$ is hydrogen or an alkyl or alkaryl radical, $R^2$ is an alkyl radical and $R^3$ is $-(CH_2)_n-$ radical where n is from 3 to 12. These solvents include compounds such as N,N-dimethylacetamide, N,N-dimethylformamide, N,N-dimethylpropionamide, N-methylbenzamide, N-methyl-2-pyrrolidone, N-ethyl-2-pyrrolidone, hexamethylphosphoramide, tetramethylsulfamide, and the like. Preferred solvents are those in which $R^1$ is a $C_1$ to $C_4$ alkyl or a benzyl radical, $R^2$ is methyl or ethyl and $R^3$ is trimethylene. Of the preferred solvents N-methyl-2-pyrrolidone is particularly preferred. The amount of solvent employed is not critical so long as there is sufficient solvent present to dissolve at least part of the components of the reacting mixture and to allow adequate contact between the reactants thereof.

Although not essential, the reaction is preferably carried out in the presence of a catalyst modifier to maximize reaction rates, olefin conversion and yields, and to minimize side reactions. Suitable modifiers include chloride ions, added as metal chlorides or HCl, and nitriles, such as benzonitrile.

The process may be carried out by forming a reaction mixture comprising olefin, $PdCl_2$, $CuCl_2$ and N,N-dialkylamide (solvent) at temperatures between about 0° and 180°C. and at atmospheric, subatmospheric or superatmospheric pressures. The order in which the components of the reaction mixture are combined is not critical. Thus, the olefin may be dissolved in the solvent and $PdCl_2$ and $CuCl_2$ subsequently added. Conveniently, a reactor vessel is charged with the catalyst system comprising solvent, $PdCl_2$, $CuCl_2$ and optionally a catalyst modifier such as benzonitrile. Olefin in the gaseous phase is then introduced near the bottom of the reactor and permitted to bubble upwardly through the catalyst system whereby a portion thereof dissolves in the solvent. An inert carrier gas (nitrogen) may be used, if desired, but preferably an excess olefin is introduced which serves as a carrier gas. Gases are removed from near the top of the reactor which comprise unreacted olefin and allylic chloride. The temperature of the reacting mixture is preferably maintained between about 110° and 155°C. and the pressure is maintained at between about 0 p.s.i.a. and 300 p.s.i.a. However, any pressure may be utilized provided there is a sufficient pressure drop across the reactor to obtain a flow of gases through the reactor.

During the reaction, $CuCl_2$ reacts with Pd°, as it is formed, to produce $PdCl_2$ according to the following equation:

$2CuCl_2 + Pd° \rightarrow 2CuCl + PdCl_2$.

As the $CuCl_2$ in the reaction mixture becomes depleted (i.e., reduced to CuCl), the reaction rate decreases and eventually Pd° (palladium metal) precipitates out. When the reaction rate has decreased below a desirable level, CuCl may be oxidized to CuCl$_2$ by introducing hydrogen chloride gas and oxygen into the reaction mixture in place of olefin:

$4CuCl + 4HCl + O_2 \rightarrow 4CuCl_2 + 2H_2O$.

When carrying out the process in the manner just described, regeneration of CuCl$_2$ is conveniently carried out by discontinuing the introduction of olefin and introducing instead a mixture of HCl and O$_2$ or a gas containing molecular oxygen. After the CuCl$_2$ is regenerated, the flow of HCl and O$_2$ is discontinued and the flow of olefin is resumed. By this technique the process consists of alternating between a production cycle and a regeneration cycle.

At the present time, the most important application of the invention is in the production of allyl chloride from propylene. Accordingly, the invention is further illustrated by means of the following examples in which propylene is converted to allyl chloride. However, it will be apparent to those skilled in the art that other allylic chlorides can also be produced by the process described herein by employing other olefins containing an allylic hydrogen atom. The examples were carried out using glass equipment and, therefore, high pressures could not be employed. However, in commercial scale operations where high pressure equipment is generally used, higher pressures (e.g., 50–200 p.s.i.) are preferred and would provide a higher conversion of olefin.

EXAMPLE 1

This example demonstrates the preparation of allyl chloride from propylene.

A catalyst mixture was prepared by adding 33.0 g. (0.25 mole) of cupric chloride and 4.4 g. (0.025 mole) of palladium chloride at 150°C. to a mixture of 65 ml. of N-methyl pyrrolidone and 55 ml. of benzonitrile. The catalyst mixture (136 ml.) was poured at 150°C. into a reactor consisting of a glass tube (28 mm I.D.) that was fitted with a fritted disc at the bottom (for dispersion of feed gas), filled with glass beads (6 mm diameter) and heated by means of a jacket filled with circulating silicon oil at 150°C.

Propylene was passed through the reactor at a rate of 638 ml./min. for 1 hour. The effluent of the reactor contained 6.73 g. of allyl chloride. At the time of maximum reaction rate a space-time-yield [g. of allyl chloride/l of catalyst solution x hr.] or 139 was observed with a conversion of propylene of 15.8% and a selectivity of greater than 90 percent.

EXAMPLE 2

In this example the procedure of Example 1 was followed with the exception that the reaction was conducted at 142°C. using propylene at a flow rate of 477–492 ml./min. for 130 mins. The yield of allyl chloride was 7.57 g. At the time of maximum reaction rate the space-time-yield was 12 [g./l × hr.] and the conversion was 18.4 percent with a selectivity of greater than 90 percent.

EXAMPLE 3

In this example the procedure of Example 1 was followed with the exception that the reaction was carried out at 131°C. for 146 mins. with a propylene flow rate of 428–536 ml./min. The yield of allyl chloride was 10.97 g. At the time of maximum activity the space-time-yield was 88 and the conversion was 13 percent with a selectivity greater than 90 percent.

EXAMPLE 4

This example illustrates the effect of pressure. The procedure of Example 1 was repeated with the exception that the pressure in the reactor was held at 5.7 p.s.i.g. 6.83 g. of allyl chloride were obtained in 45 mins. with a maximum space-time-yield of 201 at a conversion of 24.7 percent and a selectivity greater than 90 percent.

EXAMPLE 5

This example demonstrates the preparation of allyl chloride from propylene by the preferred embodiment of the invention where the process is carried out by alternating between an initial production cycle and a subsequent catalyst regeneration cycle.

Using the apparatus, procedure and reaction conditions of Example 1, a catalyst mixture consisting of 33.6 g. of cupric chloride, 4.45 g. of palladium chloride, 65 ml. of N-methyl pyrrolidone and 55 ml. of benzonitrile was prepared and added to the glass tubular reactor.

Propylene was passed through the mixture at the rate of 566–588 ml./min. for 26 mins. by which time the reaction rate had become very low. 5.16 g. of allyl chloride were obtained. At the maximum rate of reaction a space-time-yield of 192 and a conversion of 23.7 percent were observed. The catalyst was then reoxidized by passing air through the mixture at approximately 350 ml./min. for 55 mins. and at approximately 750 ml./min. for 5 mins. Hydrogen chloride gas (3 liters) was slowly bled into the air feed during the mid-period of the oxidation. Water was entrained with the air effluent.

The reoxidized mixture was treated with propylene at a flow rate of approximately 600 ml./min. for 45 mins. The yield of allyl chloride was 4.18 g. At the time of maximum reaction rate the space-time-yield was 76 and the conversion was 9.2 percent. The system was reoxidized with air and hydrogen chloride as described under cycle 1.

Propylene was passed through the newly reoxidized mixture at the rate of approximately 610 ml./min. for 59 mins. followed by reoxidiation as described in the first cycle. The yield of allyl chloride was 4.04 g. At the time of maximum reaction rate the space-time-yield was 139 and the conversion was 7.2 percent.

The reaction with propylene was repeated for 63 mins. using flows ranging from 440 to 625 ml./min. The yield of allyl chloride was 3.84 g. At the time of maximum reaction the space-time-yield was 62 and the conversion was 7.3 percent.

EXAMPLE 6

This example demonstrates the catalytic effect of cupric chloride on the decomposition of bis($\pi$-allyl palladium chloride). Cupric chloride was added to a dilute solution of bis($\pi$-allyl palladium chloride) in dimethyl acetamide at 25°C. The solution turned brown very quickly. Significant amounts of allyl chloride were detected in the gas phase above the solution. A similar solution of the palladium complex without cupric chloride present was completely stable at 25°C., producing no allyl chloride in several hours.

EXAMPLE 7

The procedure of Example 1 was repeated with the exception that in place of propylene a corresponding amount of 1-butene was fed to the reactor. A mixture of 1-chloro-2-butene and 3-chloro-1-butene was obtained.

EXAMPLE 8

This example illustrates the effect of lithium chloride as a reaction modifier. The reactor described in Example 1 was charged at 135°C. with a catalyst mixture consisting of 20.16 g. (0.15 mole) of cupric chloride, 2.65 g. (0.015 mole) of palladium chloride, 2.5 g. (0.06 mole) of lithium chloride and 120 ml. of N-methyl pyrrolidone. Propylene was passed through the reactor at a flow rate of 222 ml./min. In 2 hrs. 5.42 g. of allyl chloride were obtained. In a similar experiment with no LiCl present only 2.66 g. of allyl chloride were obtained.

What is claimed is:

1. A process for the preparation of allyl chloride by catalytic chlorination of propylene in a homogeneous liquid phase catalyst system comprising dissolving and reacting at a temperature between about 0° and 180°C. propylene, palladium chloride and cupric chloride in a solvent consisting of at least one N,N-dialkylamide of the formula

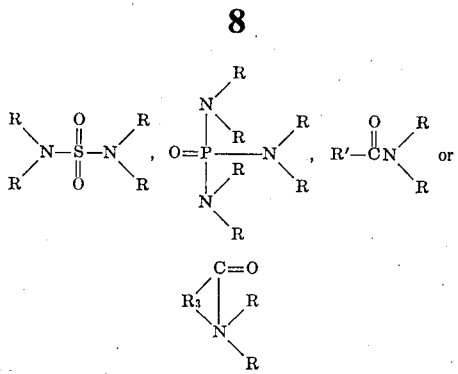

where R represents an alkyl radical, R' represents a hydrogen, alkyl or alkaryl radical R$^3$ represents $-(CH_2)_n-$ in which $n$ is an integer from 3 to 12.

2. The process of claim 1 wherein said amide contains dissolved benzonitrile as a catalyst modifier.

3. The process of claim 1 wherein said amide contains chloride ions as a catalyst modifier.

4. The process of claim 1 wherein initially the mole ratio of palladium chloride to cupric chloride is at least 3:1 and initially the moles of olefin present is at least equal to the moles of cupric chloride present initially divided by two plus the moles of palladium chloride present initially.

5. The process of claim 1 wherein the temperature of the catalyst system is maintained between about 110° and 155°C.

6. The process of claim 1 wherein the N,N-dialkylamide is N,N-dimethylacetamide.

7. The process of claim 1 wherein the N,N-dialkylamide is N-methyl-2-pyrrolidone.

8. The process of claim 1 wherein the mole ratio of CuCl$_2$ to PdCl$_2$ is from 3:1 to 10:1.

* * * * *